United States Patent Office 3,361,849
Patented Jan. 2, 1968

3,361,849
BLENDS OF ISOTACTIC PROPYLENE POLYMER AND HYDROGENATED TERPENE POLYMER
Thomas A. Cramer and John R. Lewis, Wilmington, Del., assignors to Hercules Incorporated, a corporation of Delaware
No Drawing. Filed Aug. 4, 1964, Ser. No. 387,273
4 Claims. (Cl. 260—897)

ABSTRACT OF THE DISCLOSURE

Blends of isotactic polypropylene and certain hydrogenated terpene polymers are described. The blends are particularly useful as self-supporting films, fibers, sheets and ribbons which possess outstanding physical properties and heat sealability.

This application is a continuation-in-part of my copending application Ser. No. 304,989, filed Aug. 27, 1963, and now abandoned.

The present invention relates to blends of polyolefins and certain hydrogenated hydrocarbon polymers and to free self-supporting films thereof.

Highly crystalline, high molecular weight polymers of ethylene, propylene, and higher α-olefins are relatively new synthetic polymers that are finding wide acceptance in the plastics art. One of the most promising uses for these new polymers is in the manufacture of film which in turn finds use in the packaging and related arts. In order for these films to enjoy widespread use, however, it is desirable that the film be stable upon exposure to sunlight and be easily overlap heat-sealed at a temperature which does not destroy the orientation of the film and cause film shrinkage.

Numerous solutions to the problems of light stability have been proposed. These proposed solutions, for the most part, involve the addition of small amounts of metal salts or ultraviolet screening agents to the polymer. While films of polymers containing these additives do possess improved light stability, they cannot be heat-sealed any more easily than films which do not contain such additives.

One approach which has been made to solve the heat-sealing difficulties of oriented film of these polyolefins is to provide the film with a coating of material that is more heat sensitive and hence heat sealable at a lower temperature than the film itself. This approach has met with difficulties because polyethylene and isotactic polyolefins are unreceptive to the majority of lacquers and similar materials that are normally used as heat-sealable coatings on other films such as films of regenerated cellulose.

While considerable progress has been made in improving the adhesion of heat-sealable coatings to these films, such methods are both cumbersome and expensive. There is a real need, therefore, for means whereby polyethylene and isotactic polyolefin film can be made heat sealable without resorting to a separate coating operation.

Additionally, for certain uses it is desirable that these films have a relatively high modulus. The modulus is important from the standpoint of machineability in mechanized packaging.

Blends of polypropylene and a polyterpene have been proposed as coatings for paper, and the coatings are described as heat sealable. However, such blends have very poor stability to light and heat.

In accordance with this invention, it has been found that new and very useful blends can be prepared from polyethylene and the isotactic polymers of propylene and higher α-olefins which have been mixed with from about 1 to about 60% of certain hydrogenated hydrocarbon polymers which have a drop softening point greater than about 70° C., an average molecular weight (Rast) of about 500 and above, an iodine value less than about 50, and compatibility with the polyolefin, and that these blends can be formed into films, foils, sheets, ribbons, fibers, and other filmlike and filamentary structures possessing outstanding physical properties and heat sealability as well as good light stability.

The mixtures of polyolefins and the hydrogenated hydrocarbon polymers of this invention are physical mixtures or blends of the hydrogenated hydrocarbon polymers distributed through the body of the polyolefin.

The blends of this invention are readily prepared by conventional methods of mixing and blending employed in the plastics art. For example, isotactic polypropylene flake or molding powder granules and particles or granules of the hydrogenated hydrocarbon polymer may be preliminarily mixed together in a tumbling barrel, or in a Sweetie barrel, or in a ribbon mixer, or the like, and the resulting mixture then intimately blended by malaxating on a hot two-roll mill or in a Banbury mixer, or in the barrel of a heated extruding apparatus to prepare the desired blend which may then be directly extruded into film, or reduced to suitable granules by conventional comminuting methods for charging to an extrusion apparatus.

Although any polymer of a mono-α-olefin having at least 2 carbon atoms can be employed in this invention, the invention is particularly useful with polyethylene and stereo-regular (sometimes called isotactic) polymers of mono-olefins having from 3 to 6 carbon atoms, including, for instance, polypropylene, poly(butene-1), poly(pentene-1), poly(3-methylbutene-1), and poly(4-methylpentene-1). The polymer can, and normally will, contain ingredients other than those specified in this invention. Such other ingredients include, by way of example, antacids, such as calcium stearate, antioxidants, and heat stabilizers such as alkylated phenols, alkylidene bis(alkylphenols), terpene phenols, polyhydroxychromans and alkyl esters of thiodipropionic acid, and light stabilizers such as benzophenone derivatives, and alkyl and aralkyl esters of salicylic acid, nickel phenolates, and the like.

The hydrogenated hydrocarbon polymers employed in this invention are amorphous polymerized hydrocarbon materials which are hard, brittle solids at room temperature, have a softening range at elevated temperature, a drop softening point above about 70° C., an average molecular weight (Rast) of about 500 and above, an iodine value less than about 50, and are compatible with the polyolefin. Such polymeric materials include the polymers produced by the hydrogenation of the resinous polymerization products obtained by the catalytic polymerization of mixed unsaturated monomers derived from the deep cracking of petroleum, including the commercially available materials known as "Piccopale," Velsicol X30, Velsicol AB11-4, Panarez 12-210, Neville LX series resins, and the dimers, as well as higher polymers obtained by polymerization and/or copolymerization of terpene hydrocarbons such as the acyclic, monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes, followed by hydrogenation under pressure. "Piccopale 100" is a resin made by the Pennsylvania Industrial Chemical Company and has a softening point (Ball and Ring) of approximately 100±2° C., an iodine value of about 200, and an average molecular weight of approximately 1170; Velsicol X30 and Velsicol AB11-4 are made by the Velsicol Chemical Corporation and are understood to be petroleum solids having softening points in the range of 94–104° C. and 104–110° C., respectively; Panarez 12-210 is a petroleum solid manufactured by the American Oil Company and has a softening point of 93–104° C.; the Neville resins LX685,125, LX685,135, and LX1000 are hydrocarbon resins manufactured by the Neville Chemical Company and have softening points within the range of 95–120° C. Particularly useful starting materials which can be polymerized and then hydrogenated to form the polymers employed in this invention are mixtures of unsaturated monomers composed essentially of dienes and reactive olefins derived from deep cracking petroleum, the vinyl-aromatic hydrocarbon cuts or fractions separated by distilling cracked petroleum, and the terpene mixtures containing at least 20% β-pinene and/or limonene or dipentene (racemic limonene), and the "sulfate turpentine" obtained as a by-product in the sulfate pulping process. Typical turpentine compositions from "sulfate" and other sources are shown in the following table.

insufficient to appreciably enhance the heat sealability of film produced from the blend. Above 60% by weight of the hydrogenated hydrocarbon polymer leads to brittle films having poor strength.

Formation of the blends of this invention into self-supporting films and fibers can be readily accomplished by any of the conventional extrusion, casting, or molding procedures well known in the art. For example, films of the blend may be formed by applying a solution of the blend in a solvent, as, for example, n-decane, to a hard surface such as glass, metal, etc., evaporating the solvent, and then stripping the film from the substrate. Films of these blends may be formed without the use of a solvent by spreading the molten blend on a hard surface and, after cooling, stripping off the film, or the molten blend may be extruded directly as a flat sheet, or it may be extruded into a tube, blown, and then cut and flattened. Another

TABLE 1.—TYPICAL COMPOSITION OF TURPENTINES IN WEIGHT PERCENT

| Component | Gum Turpentine | | | | | Wood Turpentine | | | Sulfate Turpentine | | | |
|---|---|---|---|---|---|---|---|---|---|---|---|---|
| | Southern [1] | Western [2] | Indian [3] | | Honduras [3] | Southern [3] | Western [2] | Mexican [3] | Southern [3] | Western [3] | Northern [3] | Scandinavian [3] |
| | | | P. excelsa | P. longifolia | | | | | | | | |
| α-Pinene | 60–65 | 3 | 89 | 23 | 68 | 75–80 | 8 | 70 | 60 | 34 | 72 | 48 |
| Camphene | | | 4 | | 3 | 4–8 | | 6 | 2 | 2 | 2 | |
| β-Pinene | 25–35 | 30 | 3 | 4 | 5 | 0–2 | 6 | 2 | 20 | 9 | 16 | 6 |
| 3-carene | | 47 | | 65 | | | | 70 | 5 | 2 | 33 | 6 | 41 |
| Limonene or Dipentene | | | 1 | | | 0–10 | | | 7 | 5 | 7 | 2 | |
| β-Phellandrene | | | | | | 13 | | | 2 | | | | |
| Terpinolene | | 3 | | | | | | | 4 | | 3 | | |
| Others | 5–8 | 17 | 3 | 8 | 11 | 5–20 | 16 | 4 | 11 | 12 | 2 | 5 |

[1] Encyclopedia of Chemical Technology, Vol. 14, The Interscience Encyclopedia, Inc., N. Y., 1955.
[2] N. T. Mirov, Journal of FPRS, Feb., 1954, pp. 1–7.
[3] Data determined by Hercules Powder Company.

The polymerization of the petroleum products or the terpene or mixture of terpenes can be carried out in known manner with or without solvent and utilizing a known catalyst such as sulfuric acid, phosphoric acid, fuller's earth, boron trifluoride, amphoteric metal chlorides such as zinc chloride or aluminum chloride, and the like. The polymerization is preferably carried out under conditions which cause substantially all of the hydrocarbon monomer to react with minimum dimer formation.

The hydrogenation of the hydrocarbon polymer can be carried out utilizing a catalyst such as nickel, nickel on kieselguhr, copper chromite, palladium on carbon, platinum on alumina, or cobalt plus zirconia on keiselguhr. The hydrogenation is preferably carried out in the presence of a solvent such as methyl cyclohexane, toluene, p-menthane, hydrogenated terpene dimer-trimer, and the like, utilizing pressures ranging from 500 to 10,000 p.s.i. and a temperature between 150 and 300° C.

While any of the hydrogenated hydrocarbon polymers prepared by methods known to the art and having average molecular weights of about 500 (Rast) and above, an iodine value less than about 50, a drop softening point above about 70° C., and compatibility with the polyolefin are operable herein, the preferred hydrogenated hydrocarbon polymers which are particularly effective in providing the improvements in accordance with the invention are characterized by average molecular weights above about 600 (Rast method), softening points above 100° C. (Hercules, drop), iodine values less than about 15, and compatibility with the polyolefin corresponding to a haze value less than about 25%, as determined on a 5-mil film which has been pressed at 232° C. and then quenched.

The amount of hydrogenated hydrocarbon polymer that is blended with the polyolefin is between about 1% and about 60% by weight of the blend, preferably between about 3% and about 50%, and more preferably between about 5% and about 40%. An amount below about 1% by weight hydrogenated hydrocarbon polymer is generally method of forming films which may be applied to these blends is to pass the blend through a pair of rolls, one of which is at a temperature above the softening temperature of the blend and the other is cold, and then cutting the sheet so formed from the roll.

These films may be used per se or they may be molecularly oriented in one or both directions in the plane of the film whereby higher tensile and impact strengths are obtained. For example, when extruded directly as a flat sheet, quenched, and then drawn in one direction below the crystalline melting point of the blend, the drawing will bring about molecular orientation in the direction of the draw. Likewise, a biaxially oriented sheet, i.e., a sheet drawn in both directions of the plane of the sheet, may be easily produced by drawing the sheet lengthwise and crosswise simultaneously, or by stretching or drawing a previously drawn sheet in the plane of the film perpendicular to that of the prior draw. This latter method of sequentially drawing the film is of particular importance when using the blends of the present invention since the hydrocarbon polymers appear to present certain processability advantages which permit the production of a balanced, biaxially oriented film using a 2-step draw, a result which could only be obtained by a 3-step process with nonblended film. In the same way, if the blend is extruded into a tube and then blown below the melting point of the blend, the latter action will bring about the molecular orientation of the film. If the film is formed by solvent-casting or by spreading the molten blend on a hard surface, molecular orientation may readily be obtained by elongation of the film. The strength and toughness of melt-cast or melt-extruded films may also be improved by rapid cooling as by means of an air or liquid stream.

As has already been pointed out, overlap heat-sealable, self-supporting, oriented films can be formed from the blends of the polyolefin and the hydrogenated hydrocarbon polymer of this invention. This, of course, is an outstanding advantage of these films over oriented films of nonblended polyolefins since there is little problem of loss of orientation or shrinkage of film during heat-sealing, which is of prime importance in film used for packaging. Another very outstanding advantage of these films is the ability to heat-seal at lower temperatures over a wider temperature range than nonblended film. Another advantage includes the considerably higher modulus (tensile) as compared with oriented films of nonblended polyolefins. The increase in modulus or stiffness is an important factor in packaging and results in an improvement in machineability. Other advantages include higher shrinkage at a given temperature, lower gas permeability, lower moisture vapor transmission, and better crease retention.

The general nature of the invention having been set forth, the following examples illustrate some specific embodiments of the invention. It is to be understood, however, that the invention is not limited to the examples since the invention may be practiced by the use of various modifications and changes within the scope of the invention as described herein. In the examples, the physical properties of the films were measured in accordance with the following ASTM test procedures:

Tenacity; Elongation; Modulus—D882–61T, 1000% elongation/minute
Overlap shear strength (heat sealability)—D1002–53T
Dart impact—D1709–59T (modified so as to measure electronically in ft. lbs./mil the loss in dart velocity caused by film failure at the time the energy loss constitutes 5–15% of the total dart kinetic energy)
Stripping peel strength (T peel)—D903–49
Gardner clarity—D1746
Gardner haze—D1003–59

The iodine value of the hydrogenated hydrocarbon polymer was determined in accordance with Method No. L 8a–57 of the American Oil Chemists Society. The compatibility of the hydrogenated hydrocarbon polymer can be determined by any of the methods described by Nielsen, Mechanical Properties of Polymers, Chapter 7, pp. 138 and 172, Reinhold Publishing Corp., New York (1962). In the following examples, compatibility was determined by melt extruding at 232° C. a blend of the polyolefin and the hydrogenated hydrocarbon polymer into strands, chilling the strands, chopping the chilled strands into molding powder granules, pressing the granules into 5-mil sheet at 232° C. under 850 p.s.i. pressure, cooling the sheet rapidly, and then determining the haze value of the sheet according to ASTM 1003–59. Light stability was evaluated by fastening 0.5-inch wide strips of 5-mil or 0.75-mil film of the blend or control onto pieces of white cardboard, exposing the strips in a fadeometer ("Color Fade-ometer," Atlas Electric Devices Co., Type FDA–R) or Xenon arc tester ("Weatherometer," Atlas Electric Devices Co., Model 60–W), and periodically examining the strips and noting the time elapsed until the strips become brittle, the embrittlement point being the time (in days) elapsed until the strip breaks when bent double. All parts and percentages are by weight unless otherwise specified. The term "RSV" as used herein denotes reduced specific viscosity, which is the specific viscosity divided by concentration of a 0.1% weight/volume solution of polymer or blend in decahydronaphthalene at 135° C. The softening point of the hydrogenated or nonhydrogenated hydrocarbon polymer is that temperature (° C.) at which the polymer changes from a rigid to a soft state, as determined by the Hercules drop method (described in Hercules report entitled, "The Hercules Drop Method for Determining the Softening Point of Rosins and Modified Rosins," No. Herc. 400–431C, 1955). The average molecular weight of the hydrocarbon polymer was determined by the Rast method described by V. A. Aluise, Ind. Eng. Chem. (Anal. Ed.) 13, 365 (1941).

*Example 1*

Seventy-five (75) parts of pulverulent isotactic polypropylene having a birefringent melting point of 167° C. and a reduced specific viscosity of 3.0 and containing 0.5% of the nickel salt of o,o'-bis(1,1,3,3-tetramethyl butylphenol) sulfone containing 14–16% nickel and 0.5% of the acid-catalyzed reaction product of 2 moles of nonylphenol and 1 mole of acetone, the reaction product comprising a mixture of isopropylidene-bis(nonylphenol) and 2(2 ′ hydroxyphenyl) - 2,4,4 - trimethyl - 5′,6 - dinonylchroman was dry blended under a carbon dioxide blanket by rotating in a baffled drum for 0.5 hour at room temperature with 25 parts of a hydrogenated polyterpene having a softening point of 131° C., an average molecular weight of 790, and an iodine value of 17, and which had been ground to pass through a 20-mesh screen. The hydrogenated polyterpene was prepared from a polyterpene having a softening point of 125–135° C. which had been prepared by treating a 50% toluene solution of refined sulfate turpentine (Southern) which had been topped and heeled to remove color forming low and high boiling fractions and which contained 20–25% β-pinene, 60–70% α-pinene, and other minor terpene constituents with anhydrous $AlCl_3$ at 10–15° C., removing the $AlCl_3$ by washing with aqueous sulfuric acid and then with $H_2O$, stabilizing (dehydrochlorinating) the resin solution with aqueous lime slurry (½–1% $Ca(OH)_2$ based on the total solution weight) at 175° C., filtering to remove the lime, separating water from the filtered resin solution, and then evaporating the water-free resin solution at 160–165° C. first under atmospheric pressure and finally at about 75 mm. mercury pressure to remove the toluene and a portion of the lower polymers and then topping at 205–230° C. and 1–2 mm. Hg absolute pressure to give a polyterpene having the desired softening point. This polyterpene was hydrogenated in methyl cyclohexane in a steel bomb using as catalyst nickel on kieselguhr and hydrogen under 5000 p.s.i. pressure at 225–230° C. for 5 hours. The solvent was then removed by distillation at a maximum pot temperature of 200–205° C. and 15–25 mm. Hg absolute pressure, and gave a stripped product which was water white. The blend of the polypropylene and the hydrogenated polyterpene was melt extruded at 205° C. into strands which were chilled and chopped into uniform molding powder granules. This molding powder was then converted into film 5 mils thick by compression molding the granules into sheets at 232° C. and 850 p.s.i. pressure and cooling rapidly. Two control films were similarly produced except that control film No. 1 was made from polypropylene which was not blended with the hydrogenated polyterpene, and control film No. 2 was made from a blend of the polypropylene and the nonhydrogenated polyterpene resin which was used above for the hydrogenation step, the resin having a softening point of 125–135° C., an average molecular weight of 720–840, and an iodine value of about 150–160. Light stability test results for each of the films are recorded in Table 2.

TABLE 2

| Example | Embrittlement time on UV exposure (days) | | RSV after 1 day in fadeometer |
|---|---|---|---|
| | Xenon Arc | Fadeometer | |
| 1 | 8 | 4 | 2.3 |
| Control 2 | 2 | 1 | 0.61 |
| Control 1 | 30 | 16 | 3.0 |

*Examples 2–9*

The procedure of Example 1 was repeated using the various hydrogenated polyterpenes listed in Table 3, the polyterpenes being prepared in the manner of Example 1 except as noted below and in the table. The decatalyzed resin solution of Examples 2 and 3 were stabilized (dehydrochlorinated) thermally rather than with lime as in Example 1, the stabilization being carried out by removing the toluene under reduced pressure, heating at 260–280° C. for 1 hour, and then steam sparging at 200° C. until the distillate was neutral. The polyterpene of Example 9 was hydrogenated in a continuous hydrogenation unit as a solution in hydrogenated terpene dimer-trimer at an hourly liquid space velocity in the range of 3 to 10 pounds per hour per cubic foot under 3000 to 5000 p.s.i. hydrogen pressure at 250–255° C. The hydrogenated dimer-trimer solvent was then removed by distillation at a maximum pot temperature of 255–265° C. at 3 mm. Hg absolute pressure to give a stripped product having a color of 1 amber, a drop softening point of 135° C., an average molecular weight of 840, and an iodine value of 32. The light stability rating, evaluated as embrittlement time after ultraviolet exposure, is recorded below for each in Table 3. Although some variations in the light stability ratings are evident due to minor variations in light intensity in the Weatherometer, over-all effect of complete hydrogenation is clearly evident from the scope and pattern of the examples.

rate of 86 lbs./hr. output, and a haul-off speed of 70 ft./min. A control film was similarly produced except that the biaxially oriented film was made from non-blended polypropylene. Properties of each of the films are recorded in Table 4. The linear shrinkage of the films was evaluated by hanging 1" x 20" strips of the film for 2 minutes in a hot air oven and determining the loss in length of the strip. Heat-sealing characteristics of the films were determined by running the films in a packaging trial on the FA overwrap machine (a model No. FA packaging machine manufactured by Packaging Machinery Company, East Longmeadow, Mass.) and heat-sealing at 121–138° C. Very strong overlap heat seals which gave lap shear strengths averaging 5 lb./linear inch were formed from the blend film without loss of orientation or appreciable film shrinkage. By contrast, the control film, at a lower operating rate, could not be sealed; increasing the sealing temperature to 160° C. gave weak seals and distortion of the film. The "shrink-wrapping" characteristics of the films were compared by wrapping an article loosely with film to form a package, sealing the package with impulse cut-off seals as described in

TABLE 3

|  | Example | | | | | | | |
|---|---|---|---|---|---|---|---|---|
|  | 2 | 3 | 4 | 5 | 6 | 7 | 8 | 9 |
| Starting material | (¹) | (²) | (³) | (³) | (³) | (³) | (²) | (³) |
| Polymerization Temp. (° C.) | 20–40 | 20–40 | 9–15 | 9–15 | 9–15 | 9–15 | 20–40 | 9–15 |
| Topped | No | No | Yes | Yes | Yes | Yes | No | Yes |
| Softening point of polyterpene (° C.) | 126 | 128 | 125–135 | 125–135 | 125–135 | 125–135 | 128 | 120–135 |
| Hydrogenatio catalyst⁴ | A | A | B | B | C | C | A | C |
| Hydrogenation solvent | (⁵) | (⁵) | (⁷) | (⁷) | (⁷) | (⁷) | (⁵) | (⁸) |
| Iodine value | 22 | 12 | 6 | 1 | 40 | 50 | 10 | 32 |
| Softening point of hydrogenated polyterpene (° C.) | 147 | 146 | >100 | >100 | >100 | >100 | 141 | 135 |
| Average molecular weight (Rast) | 1,000 | 1,500 | >800 | >800 | >800 | >800 | 1,300 | 840 |
| Embrittlement time on UV exposure (days): |  |  |  |  |  |  |  |  |
| Xenon arc | 3 | 5 | 8 | 30 | 3.5 | 2.5 | 14 | 6 |
| Fadeometer | 3 | 5 | 5 |  | 1.0 | 1.0 |  |  |
| RSV after 1 day in fadeometer⁹ | 1.7 | 2.4 | 2.5 |  | 0.6 | 0.5 |  |  |

¹ Dipentene containing 97–98% dipentene and 1–2% myrcene.
² β-Pinene containing 89% β-pinene, 7% α-pinene, and other terpenes.
³ Southern sulfate turpentine containing 60–70% α-pinene plus 20–25% β-pinene and other terpenes.
⁴ A = nickel on kieselguhr; B = 50% nickel plus 2% zirconia on kieselguhr; C = Raney nickel.
⁵ Hydrogenation carried out under 2000 p.s.i. pressure at 250–300° C.
⁶ Methyl cyclohexane.
⁷ p-Menthane.
⁸ Hydrogenated terpene dimer-trimer.
⁹ RSV before exposure, 2.5.

*Example 10*

Seventy-five (75) parts of pulverulent isotactic polypropylene having a birefringent melting point of 167° C. and a reduced specific viscosity of 3.5 and containing 0.25% dilaurylthiodipropionate, 0.1% of the condensation product of 1 mole crotonaldehyde and 3 moles of 3-methyl-6-tert-butylphenol and 0.1% calcium stearate, by weight of the polymer, were dry blended in a high speed pin mill for 3 minutes with 25 parts of a hydrogenated polyterpene having a softening point of 122–128° C., an iodine value less than 10, and an average molecular weight of 700–760. The hydrogenated polyterpene was prepared using the method and apparatus of Example 1 as a solution in hydrogenated terpene dimer-trimer, removing the solvent, dissolving the stripped product in p-menthane, repeating the hydrogenation step, and then removing the p-menthane solvent. The stripped product had a color of 1 amber. The blend of the polypropylene and the hydrogenated polyterpene was melt extruded at 205° C. into strands which were water cooled and chopped into uniform molding powder granules. The molding powder was converted into biaxially oriented film 0.75 mil thick using the method and apparatus described in U.S. 2,863,172 to Buteux et al., the extrusion being carried out at 220–235° C. using a 2.5-inch ring die, an extrusion Package Engineering, Vol. 8, No. 5, May 1963, and then exposing the package to heat in a hot air oven for 1 second. The blend film was easier to use in shrink wrapping and gave tight, good-appearing packages over a wider range of shrinkage temperatures than did the control film.

TABLE 4

|  | Example 10 | Control |
|---|---|---|
| Tensile strength (p.s.i.) | 25,000–30,000 | 25,000–30,000 |
| Elongation (percent) | 50–75 | 60–80 |
| Modulus (p.s.i.) | 400,000–500,000 | 320,000–350,000 |
| Clarity (percent) | 85 | 75–80 |
| Haze (percent) | 0.1 | 0.4 |
| Dart impact strength (ft. lbs./mil) | 2 | 3 |
| Linear shrinkage at 120° C. (percent): |  |  |
| Machine direction | 22 | 12 |
| Cross direction | 33 | 15 |
| Embrittlement time (days)¹ | 16 | 25 |

¹ Xenon arc.

*Example 11*

The molding powder of Example 10 was converted into 12-mil biaxially oriented film by extruding the molding powder at 232° C. through a die having a 6" by 0.015" slit onto a roll internally cooled with water at 15.5° C. and rotating at 7 ft./min., stretching the film 4 times in the cross direction at 120° C., stretching the film 4 times in the machine direction at the same temperature, and then cooling to room temperature. A control film was similarly produced except that the molding powder was made from nonblended polypropylene and the film was stretched at 140° C. Films of the blend were more uniform in thickness and had higher strength and shrinkage values than films of the control. Additionally, it was possible to draw the blend films more easily without evidence of "necking," i.e., a yielding during stretch which results in a nonuniformity of thickness, at lower temperatures and over a wider temperature range than when using the control film.

*Example 12*

Eighty (80) parts of pulverulent isotactic polypropylene having a birefringent melting point of 167° C. and a reduced specific viscosity of 3.0 and containing about 0.01 part di-tert-butyl-p-cresol was thoroughly blended with 0.1 part calcium stearate, 0.25 part dilaurylthiodipropionate, 0.1 part of the condensation product of 1 mole of crotonaldehyde, and 3 moles of 3-methyl-6-tert-butylphenol, and 20 parts of a hydrogenated hydrocarbon polymer ground to pass through a 20-mesh screen and having a softening point of 105° C., an average molecular weight of about 1170, and an iodine value of 25, and prepared by hydrogenating the resinous catalytic polymerization product of unsaturated monomers derived from cracked petroleum and composed essentially of dienes and reactive olefins. The hydrogenation was carried out in p-menthane using as catalyst Raney nickel and hydrogen under 5000 p.s.i. pressure at 250° C. for 8 hours and the p-menthane was removed by distillation at a maximum pot temperature of 180° C. and less than 1 mm. Hg absolute pressure. The blend of the polypropylene and the hydrogenated polymer was melt-extruded at 232° C. into strands which were chilled and chopped into molding powder granules. This molding powder was then converted into film 12 mils thick by compression molding the granules into sheets at 232° C. and 850 p.s.i. pressure and cooled rapidly. The pressed sheets were converted into biaxially oriented film 0.75 mil thick by stretching the sheet 4 times in both directions simultaneously at 121° C. Two control films were similarly produced except that control film No. 1 was made from polypropylene which was not blended with the hydrogenated polymer and was stretched at 135° C., the film thickness being about 0.70 mil, and control film No. 2 was made from a blend of polypropylene and the hydrocarbon product which was used above for the hydrogenation step, the product having a softening point of 106° C., an average molecular weight of about 1170, and an iodine value of 191.5. Properties of each of the films evaluated as in Example 10 are recorded in Table 5 below.

TABLE 5

|  | Example 12 | Control 1 | Control 2 |
|---|---|---|---|
| Tensile strength (p.s.i.) | 21,000 | 26,000 | 19,000 |
| Elongation (percent) | 116 | 100 | 72 |
| Modulus (p.s.i.) | 380,000 | 290,000 | 370,000 |
| Haze (percent) | 3 | 1 | 9 |
| Linear shrinkage at 140° C. (percent) | 43 | 30 | 42 |
| Embrittlement time (days): |  |  |  |
| Xenon arc | 5 | 15 | 2 |
| Fadeometer | 3 | 10 | 1 |
| Overlap T-peel seal strength (lb./in.) [1] | 0.24 | <0.05 | 0.20 |

[1] Seals made at 135° C.

*Example 13*

Biaxially oriented film was prepared according to the procedure of Example 12 except that a hydrogenated hydrocarbon polymer having a softening point of 115° C. and an iodine value of 18 was substituted for the hydrogenated polymer of Example 12. The hydrogenated polymer was prepared from a resin having a softening point of 115° C. and an iodine value of 80 which had been prepared by treating a benzene solution of a vinyl aromatic hydrocarbon distillate fraction boiling at 90–280° C. with anhydrous $AlCl_3$ at 10° C., decomposing the catalyst with calcium hydroxide solution and methanol, filtering off the precipitated salts, separating the water, and then distilling solvent and unreacted material to a maximum pot temperature of 240° C. and at less than 0.1 mm. Hg absolute pressure to give a resin having the desired softening point. This hydrocarbon resin was hydrogenated in methyl cyclohexane using as catalyst palladium on carbon and hydrogen under 5000 p.s.i. pressure at 250° C. for 6 hours. The solvent was then removed by distillation at a maximum pot temperature of 180° C. and less than 0.1 mm. Hg absolute pressure. Properties of the film evaluated as in Example 12 are tabulated below.

TABLE 6

| Tests: | Example 13 |
|---|---|
| Tensile strength (p.s.i.) | 21,000 |
| Elongation (percent) | 100 |
| Modulus (p.s.i.) | 350,000 |
| Embrittlement time (days) |  |
| Xenon arc | 7 |
| Fadeometer | 3 |
| Overlap T-peel seal strength (lb./in.) [1] | 0.39 |

[1] Seals made at 135° C.

What we claim and desire to protect by Letters Patent is:

1. A blend consisting essentially of (1) a highly crystalline, high molecular weight isotactic polymer of propylene and (2) a hydrogenated polymer consisting essentially of terpenene hydrocarbons, said hydrogenated polymer having an iodine value less than 15, a drop softening point above about 70° C., an average molecular weight (Rast) of about 500 and above, and compatibility with the polyolefin corresponding to a haze value less than about 25%, as determined on a 5-mil film which has been pressed at 232° C. and then quenched, and being present in an amount ranging from about 5 to about 40% by weight of the blend.

2. An unsupported film of the blend of claim 1.

3. A film according to claim 2 which is oriented along at least one of its axes.

4. A film according to claim 3 which is biaxially oriented.

References Cited

UNITED STATES PATENTS

| 3,278,646 | 10/1966 | Lambert | 260—897 |
| 2,152,533 | 3/1939 | Carmody | 260—93.3 |
| 2,319,959 | 5/1943 | Tierney | 260—93.1 |
| 2,397,205 | 3/1946 | Rummelsburg | 260—93.3 |
| 3,144,430 | 8/1964 | Schaffhausen | 260—897 |
| 3,220,966 | 11/1965 | Flanagan | 260—897 |
| 3,247,142 | 4/1966 | Brunson et al. | 260—897 |

OTHER REFERENCES

Wakeman, R. L.: The Chemistry of Commercial Plastics, pp. 290–296 (1947).

G. F. LESMES, *Primary Examiner.*

T. G. FIELD, *Assistant Examiner.*

UNITED STATES PATENT OFFICE
CERTIFICATE OF CORRECTION

Patent No. 3,361,849                       January 2, 1968

Thomas A. Cramer et al.

It is hereby certified that error appears in the above numbered patent requiring correction and that the said Letters Patent should read as corrected below.

Columns 7 and 8, TABLE 3, first column, line 5 thereof, for "Hydrogenatio" read -- Hydrogenation --; same table, fourth column, line 5 thereof, for "B" read -- B(5) --; column 10, line 40, for "terpenene" read -- terpene --.

Signed and sealed this 11th day of March 1969.

(SEAL)
Attest:

Edward M. Fletcher, Jr.                       EDWARD J. BRENNER
Attesting Officer                              Commissioner of Patents